United States Patent [19]
Miyazoe et al.

[11] Patent Number: 5,924,439
[45] Date of Patent: Jul. 20, 1999

[54] TWO-PORT SOLENOID VALVE USING VALVE BODY FOR FIVE-PORT SOLENOID VALVE

[75] Inventors: Shinji Miyazoe; Bunya Hayashi; Makoto Ishikawa, all of Ibaraki, Japan

[73] Assignee: SMC Corporation, Tokyo, Japan

[21] Appl. No.: 09/116,833

[22] Filed: Jul. 17, 1998

[30] Foreign Application Priority Data

Aug. 14, 1997 [JP] Japan ................................. 9-233395

[51] Int. Cl.$^6$ ............................. F15B 13/08; F16K 11/20
[52] U.S. Cl. .................. 137/269; 137/271; 137/596.16; 137/596.18; 137/883; 137/885
[58] Field of Search ................................. 137/269, 271, 137/596.16, 596.18, 883, 885

[56] References Cited

U.S. PATENT DOCUMENTS

| | | | |
|---|---|---|---|
| 4,234,162 | 11/1980 | Kay | 251/324 X |
| 4,924,902 | 5/1990 | Lewis et al. | 137/271 X |
| 5,529,088 | 6/1996 | Asou | 137/271 X |
| 5,597,015 | 1/1997 | Asou et al. | 137/625.64 |
| 5,606,993 | 3/1997 | Stoll | 137/596.16 X |

*Primary Examiner*—Gerald A. Michalsky
*Attorney, Agent, or Firm*—Oblon, Spivak, McClelland, Maier & Neustadt, P.C.

[57] ABSTRACT

Inexpensive two-port solenoid valves that can be connected with five-port solenoid transfer valves are provided. Two valve discs 25A and 25B constituting a two-port valve are inserted into a five-port valve body 15 having a supply channel 21 opened at the center of a valve hole 20; output channels 22A and 22B are opened on the respective sides of the supply channel; and ejection channels 23A and 23B are opened on the respective sides of the output channels. A pilot valve section 12 is used to drive the valve discs. The valve discs 25A and 25B use the fluid pressure in the supply channel 21 as returning force for the valve bodies, and each has seal members 28A and 28B for continuously sealing the portion between the output channels 22A and 22B and the ejection channels 23A and 23B, respectively, regardless of the operating positions of the valve discs; and each also has seal members 29A and 29B for opening and closing the portion between the supply channel 21 and the output channels 22A and 22B, respectively.

3 Claims, 5 Drawing Sheets

FIG. 5

TWO-PORT SOLENOID VALVE USING VALVE BODY FOR FIVE-PORT SOLENOID VALVE

FIELD OF THE INVENTION

The present invention relates to a two-port solenoid valve suitable for use with a large number of connected five-port solenoid valves or a solenoid valve in which two-port or three-port valves are mixed.

PRIOR ART

Five-port solenoid transfer valves are commonly connected together on rails or manifold bases to operate various fluid-pressure-driven apparatuses, and in some cases, these valves must include two-port solenoid valves. Since, however, two-port valves have functions significantly different from those of five-port valves, they typically differ from five-port valves in form and cannot be connected with them. Thus, two-port valves must be prepared separately from five-port valves, thereby limiting the integration of various valves.

In addition, if an attempt is made to manufacture two-port valves that are similar to five-port valves in form, the two-port valves must include unwanted structures to compensate for the significant difference in function between these two types of valves, resulting in an unwanted increase in costs.

DISCLOSURE OF THE INVENTION

It is a technical object of this invention to provide an inexpensive two-port solenoid valve that can be connected and used with five-port solenoid transfer valves.

It is a specific technical object of this invention to provide an inexpensive two-port valve for use with a large number of connected five-port valves by integrating two two-port solenoid valves or one two-port and one three-port valves into a valve body for a five-port solenoid valve.

To achieve these objects, this invention provides a two-port solenoid valve comprising a main valve having a five-port valve body in which a valve hole is opened and which has a supply channel opened at the center of the valve hole, two output channels opened on the respective sides of the supply channel, and two ejection channels opened on the respective sides of the output channels, the main valve also having a valve disc slidably disposed in the valve hole, and first and second pistons on the respective axial sides of the valve hole, the main valve operating the valve disc using the effect of a pilot fluid pressure on the pistons, the solenoid valve also comprising a pilot valve section consisting of first and second pilot valves, including first and second solenoid mechanisms that operate to individually apply a pilot fluid pressure to the first and second pistons, characterized in that the valve disc that is inserted into the valve hole in the valve body is composed of two valve discs located on the respective sides of the supply channel and using the acting force of the fluid pressure in the supply channel, as returning force for the valve discs, and in that these valves each have a seal section for continuously sealing the portion between the output and ejection channels regardless of the operating positions of the valve discs, and a seal section for opening and closing the portion between the supply and output channels.

To achieve the above object, a two-port solenoid valve according to this invention in which the two ejection channels are fluid channels to which a positive or a negative pressure fluid is supplied, wherein the valve disc that is inserted into the valve hole in the valve body is composed of two valve discs located on the respective sides of the supply channel and using the acting force of the fluid pressure in the supply channel, as returning force for the valve discs, and wherein these valves each have a seal section for continuously sealing the portion between the supply and output channels regardless of the operating positions of the valve discs, and a seal section for opening and closing the portion between the output and fluid channels.

Furthermore, this invention provides a solenoid valve wherein one of the two valve discs inserted into the valve hole in the valve body has a seal section for continuously sealing the portion between the output and ejection channels regardless of the operating positions of the valve discs, and a seal section for opening and closing the portion between the supply and output channels, while the other valve disc has a seal section for a three-port valve that switches the output channel between the supply and ejection channels for communication.

In addition, in a solenoid valve according to this invention, near the valve discs on the land side of seal members, which are provided on the valve disc to form the seal section and which switch between a communication position on one side of a channel at which the seal members are dislocated from lands and a sealing position at which the seal members ride onto the lands, a plurality of guide sections that are located on the lands to guide seal members onto the lands even when the seal members are dislocated from the lands are effectively provided in such a way that a communication gap for a fluid flowing through the channel is provided between the guide sections.

Since a two-port valve of such a configuration can directly use a valve body for a five-port solenoid to share various parts of the five-port solenoid valve, an inexpensive two-port solenoid valve can be provided that can be connected together with five-port solenoid transfer valves despite the needs for a very small number of unwanted structures. In addition, since the valve disc that is inserted into the valve is divided into two sections, the positions of the valve discs may become unstable, causing the seal members to inappropriately ride onto the lands unless the movement of the valve discs in the axial direction is taken into consideration. The provision of the guide sections, however, enables the seal members to appropriately ride onto the lands while maintaining a required flow.

DETAILED DESCRIPTION

Figure 1:
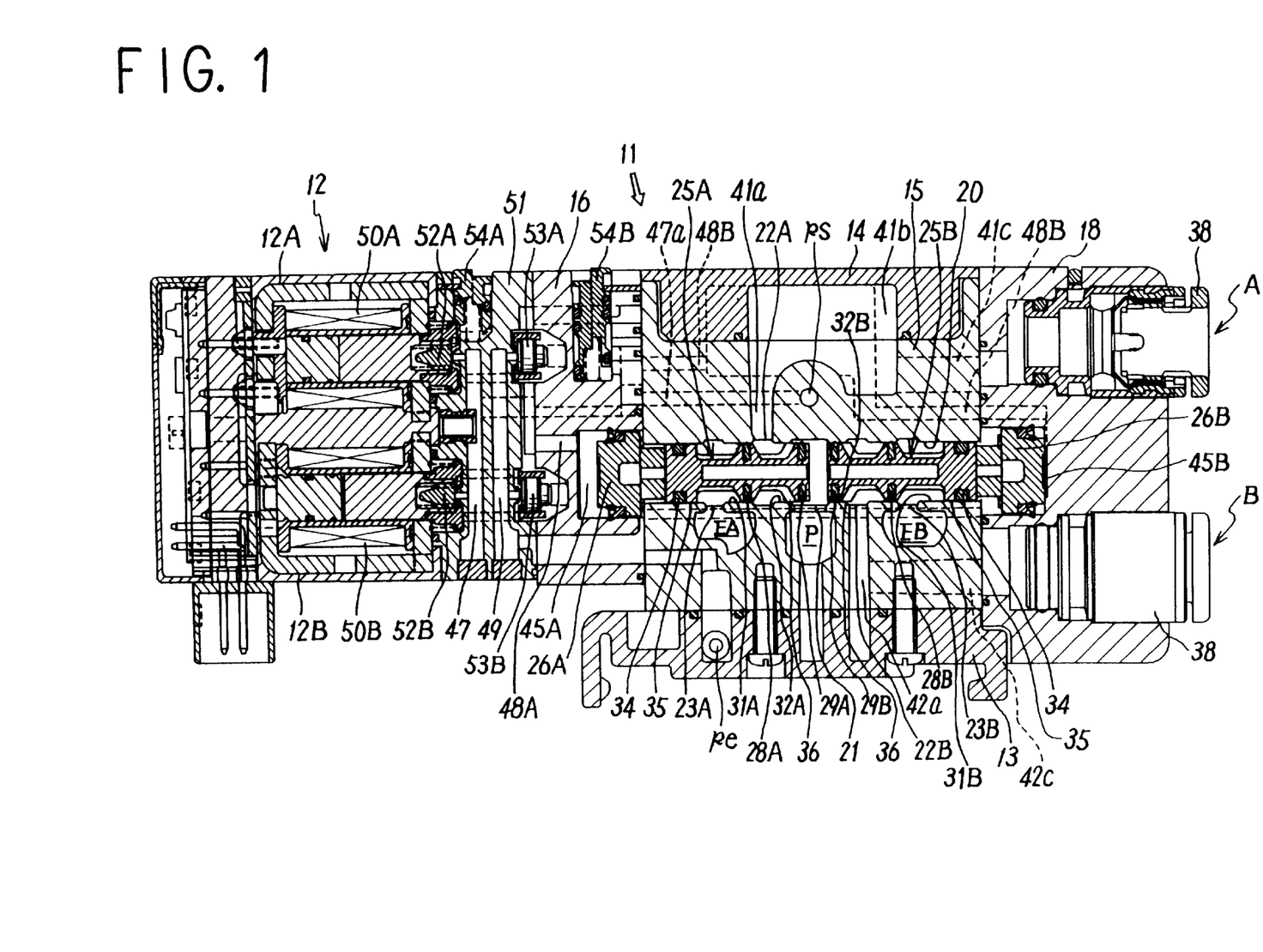
FIG. 1 is a sectional view showing a first embodiment of a two-port solenoid valve according to this invention.
Figure 2:
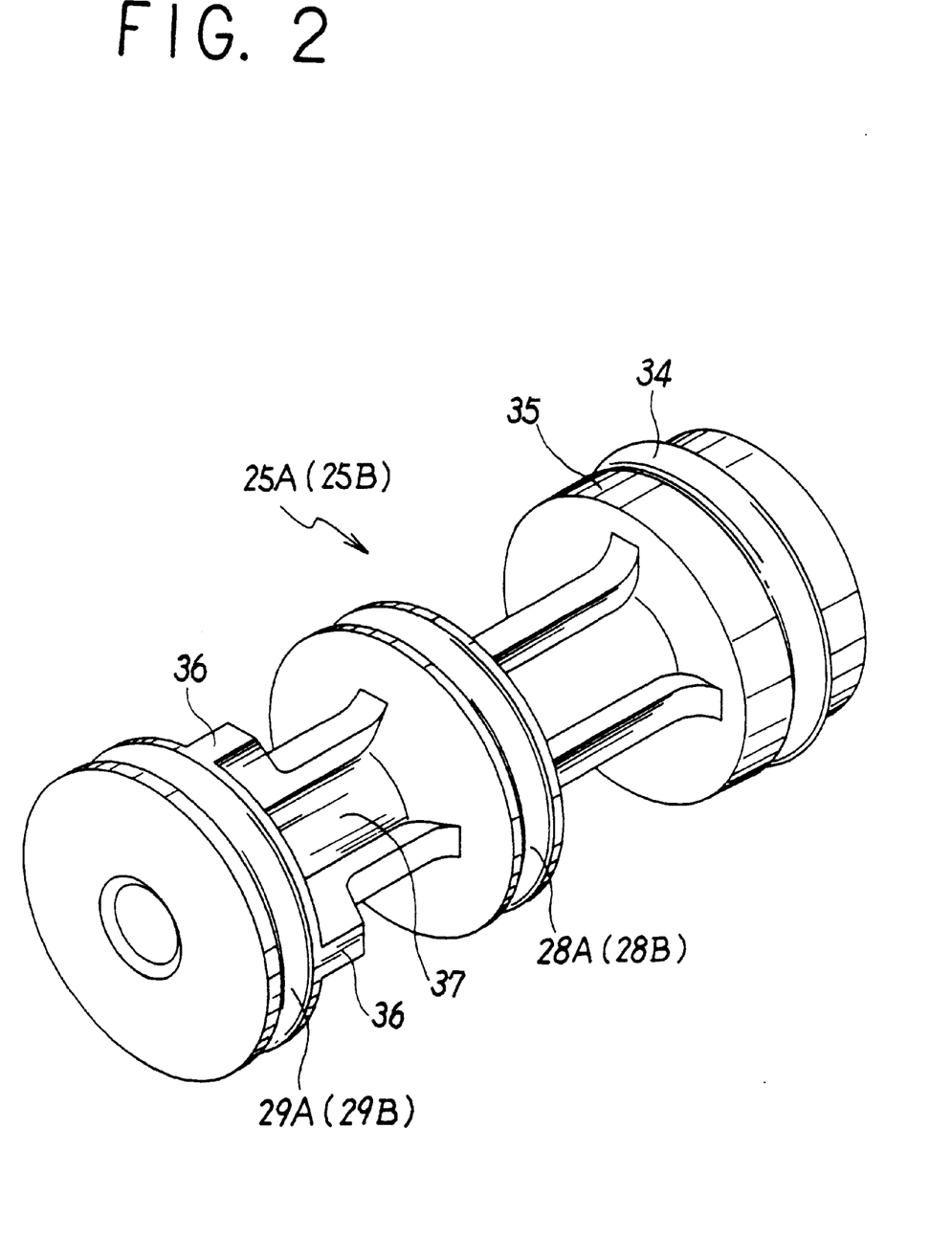
FIG. 2 is an enlarged perspective view showing the structure of a valve disc according to the first embodiment.

FIGS. 1 and 2 show a first embodiment of a two-port solenoid valve according to this invention. This two-port solenoid valve is formed by integrating two two-port valve discs, which are described below, into a valve hole inside a valve body for a five-port solenoid valve, and comprises a main valve 11 into which the valve discs are integrated; and a pilot valve section 12 having first and second pilot solenoid valves 12A and 12B. A bottom cover 13 on the main valve 11 can be used to connect a plurality of two-port solenoid valves with a large number of five-port solenoid valves on DIN rails (not shown).

The main valve 11 comprises a valve body 15 on which the bottom cover 13 and a top cover 14 are mounted; a piston box 16 mounted on one of the end surfaces of the valve body 15; and an end plate 18 mounted on the other end surface of the valve body 15. Since the valve body 15 is used for five-port solenoid valves, it includes a supply through-hole P, first and second ejection through-holes EA and EB, and a pilot supply through-hole ps for compressed air, all of which penetrate the valve body 15 in the direction in which a plurality of valve bodies 15 are connected together in such a manner that a plurality of respective through-holes are in mutual communication, and also includes a valve hole 20 that penetrates both end surfaces on which the piston box 16 and end plate 18 are mounted. A central supply channel 21 in communication with the supply through-hole P, two output channels 22A and 22B located on the respective sides of the supply channel 21, and two ejection channels 23A and 23B located on the respective sides of the output channels 22A and 22B and communicating with the first and second ejection through-holes EA and EB are all opened into the valve hole 20. Although a plurality of main valves 11 are connected together on DIN rails using the bottom cover 13, the supply through-hole P, first and second ejection through-holes EA and EB, and pilot supply through-hole ps may be provided in a manifold base, on which a plurality of valve bodies 15 each having the valve hole 20 may be connected together.

The valve disc that is slidably inserted into the valve hole 20 in the valve body 15 is composed of two valve discs 25A and 25B located on the respective sides of the supply channel 21 and using as return force the acting force of the fluid pressure in the supply channel. In addition, first and second pistons 26A and 26B that are separate from the valve discs 25A and 25B, respectively, that press the valve discs 25A and 25B when subjected to the pressure of a pilot fluid, and that have a larger diameter than the valve discs 25A and 25B are disposed on the respective axial sides of the valve hole 20.

The valve discs 25A and 25B have seal members 28A and 28B, respectively, that continuously seal the portions between the output channels 22A and 22B and the ejection channels 23A and 23B, respectively, regardless of the operating positions of the valve discs; and seal members 29A and 29B that open and close the portions between the supply channel 21 and the output channels 22A and 22B, respectively, using the operation of the valve discs.

Thus, the seal members 28A and 28B continuously contact lands 31A and 31B, respectively, between the output channels 22A and 22B and the ejection channels 23A and 23B, respectively, while the seal members 29A and 29B move repeatedly between an intermediate position at which they are located on the supply channel 21 and a position between the supply channel 21 and the output channels 22A and 22B at which they ride onto lands 32A and 32B, respectively, in response to the operation of the valve discs.

The valve discs 25A and 25B are separately inserted into the valve hole 20 into which, in the case of a five-port valve, a single valve disc is inserted while being guided at both ends. Thus, unless measures are taken for the guide for the valve discs 25A and 25B, the supply channel 21 side of the valve disc is not guided so that the position of the valve disc is unstable. Consequently, the axes of the valve discs 25A and 25B are tilted relative to the axis of the valve hole 20 to prevent the seal members from functioning appropriately. In this case, the seal members 28A and 28B, which are continuously located on the lands 31A and 31B, respectively, do not require measures for preventing the seal members from slipping out from fitting grooves or cutting into the lands 31A and 31B, respectively, when riding onto them, but the seal members 29A and 29B that repeatedly ride onto the lands 32A and 32B, respectively, may be damaged when riding onto the lands if the axes of the valve discs 25A and 25B are tilted relative to the axis of the valve hole 20.

Thus, a guide section 35 is provided at the piston side end of each of the valve discs 25A and 25B and adjacent to a seal member (an O ring) 34, and near the valve discs on the land side of the seal members 29A and 29B that open and close the channels, i.e., switch between a communication position (the operating position of the valve disc 25A in FIG. 1) on one side of the supply channel 21 at which the seal member is dislocated from the land 32A or 32B and a sealing position (the operating position of the valve disc 25B in FIG. 1) at which the sealing member rides onto the land, a plurality of guide sections 36 that are located on the lands 32A and 32B to guide the seal members 29A and 29B, respectively, onto the lands even when the seal members 29A and 29B are dislocated from the lands 32A and 32B are provided in such a way that a channel groove 37 for a fluid flowing through the supply channel 21 is provided between the guide sections 36, as clearly shown in FIG. 2.

Although these guide sections 35 and 36 are provided to stabilize the positions of the valve discs 25A and 25B, only a plurality of guide sections (e.g., the guide sections 36) may be provided that allow the seal members (e.g., the seal members 29A and 29B), which assume the communication position at which they are dislocated from the lands and the sealing position at which they ride onto the lands, to smoothly ride onto the lands and that are located on the lands to guide the seal members onto the lands even when the seal members are dislocated from the lands, as in the embodiment described below.

The valve discs 25A and 25B featuring such a structure have a complicated shape, so they may be particularly effectively manufactured by means of molding with synthetic resin.

First and second output ports A and B are opened in the outer side of the end plate 18 mounted on the valve body 15 in such a way that the ports A and B are located in parallel in the vertical direction, and the first and second output channels 22A and 22B opened into the valve hole 20 are in communication with the output ports A and B through passages formed in the valve body 15. In FIG. 1, a one-touch joint 38 is installed in each of the output ports A and B.

The first output channel 22A is allowed to communicate with the output port A by opening the first output channel 22A through a guiding channel 41a into a channel 41b formed by mounting the top cover 14 in a recessed portion of the top surface of the valve body 15 and opening the channel 41b into the first output port A through a through-hole 41c opened in the valve body 15. On the other hand, the opposite second output channel 22B is opened from the bottom surface of the valve body 15 through a guiding channel 42a, which is in communication with the second output port B via a through-hole 42c opened in the valve 15.

The first piston 26A is slidably inserted into a first piston chamber 45A in an air-tight manner, the chamber 45A being formed in the piston box 16, and the second piston 26B is slidably inserted into a second piston chamber 45B in an air-tight manner, the chamber 45B being formed in the end plate 18. When a pilot fluid is supplied to the first piston chamber 45A from a first output channel 48A, the force of a pilot fluid pressure acting on the first piston 26A of a larger diameter than the valve disc 25A exceeds the force of a pressurized fluid from the supply through-hole P acting on the opposite end surface of the valve disc 25A, so the valve disc 25A moves rightward to the communication position shown in FIG. 1 to allow the supply channel 21 to communicate with the first output channel 22A, thereby causing the pressurized fluid to be output from the first output port A. When the pilot fluid in the first piston chamber 45A is ejected, the valve disc 25A returns under the acting force of the pressurized fluid through the supply through-hole P. In addition, when a pilot fluid is supplied to the second piston chamber 45B through a second pilot output passage 48B, the second piston 26B and valve disc 25B similarly move leftward to allow the supply channel 21 and second output channel 22B to mutually communicate, thereby causing a pressurized fluid to be output from the second output port B. In these cases, the lands 31A and 31B located between the output channels 22A and 22B and the ejection channels 23A and 23B, respectively, are continuously contacted with the seal members 28A and 28B, respectively, regardless of the operating positions of the valve discs, thereby continuously sealing the portion between the output channel and the ejection channel.

The first and second pilot solenoid valves 12A and 12B installed on the pilot valve section 12 in parallel to drive the valve discs 25A and 25B are configured as well-known normally-closed three-port solenoid valves; these solenoid valves include a pilot inlet passage 47, the pilot output passages 48A and 48B, and a pilot exhaust passage 49, and energize and de-energize solenoids 50A and 50B to switch the pilot output passages 48A and 48B between the pilot inlet passage 47 and the pilot exhaust passage 49 for communication. The pilot inlet passage 47 for these pilot solenoid valves 12A and 12B is in communication with the pilot supply passage ps through a passage 47a formed in a pilot valve main body 51 and the piston box 16 and valve body 15. A pilot output passage 48A for the solenoid valve 12A is in communication with the first piston chamber 45A, a pilot output passage 48B for the solenoid valve 12B is in communication with the second piston chamber 45B, and the pilot exhaust passage 49 for the solenoid valves 12A and 12B is in communication with a pilot ejection passage pe.

The pilot solenoid valves 12A and 12B include inlet valve discs 52A and 52B and exhaust valve discs 53A and 53B located on the respective sides of the pilot valve main body 51 to operate cooperatively. When the solenoid 50A or 50B is energized, the inlet valve disc 52A or 52B is opened to allow the pilot inlet passage 47 to individually communicate with the first or second pilot output passage 48A or 48B, while the exhaust valve disc 53A or 53B is closed to shut off the passage leading from the pilot output passage 48A or 48B to the pilot exhaust passage 49. Consequently, a pilot fluid is supplied to the piston chamber 45A or 45B. In addition, when the solenoid 50A or 50B is de-energized, the inlet valve disc 52A or 52B is closed and the exhaust valve disc 53A or 53B is opened to open the passage leading from the pilot output passage 48A or 48B to the pilot exhaust passage 49, causing the pressurized fluid fed to the piston chamber 45A or 45B to be individually ejected. As a result, the acting force of the pressure of the fluid flowing into the valve hole 20 from the supply through-hole P via the supply channel 21 acts as a returning force for the valve disc 25A or 25B, causing it to return.

First and second manual operating devices 54A and 54B provided in the pilot valve main body 51 and piston box 16 are each continuously urged by a spring in a direction in which these devices protrude so that they can be pressed. When an event such as service interruption prevents the solenoids 50A and 50B from driving the valve discs 25A and 25B, these devices are pressed to allow the pilot supply passage ps to communicate with the pilot output passages 48A and 48B in order to enable the valve discs 25A and 25B to be driven.

Figure 3:
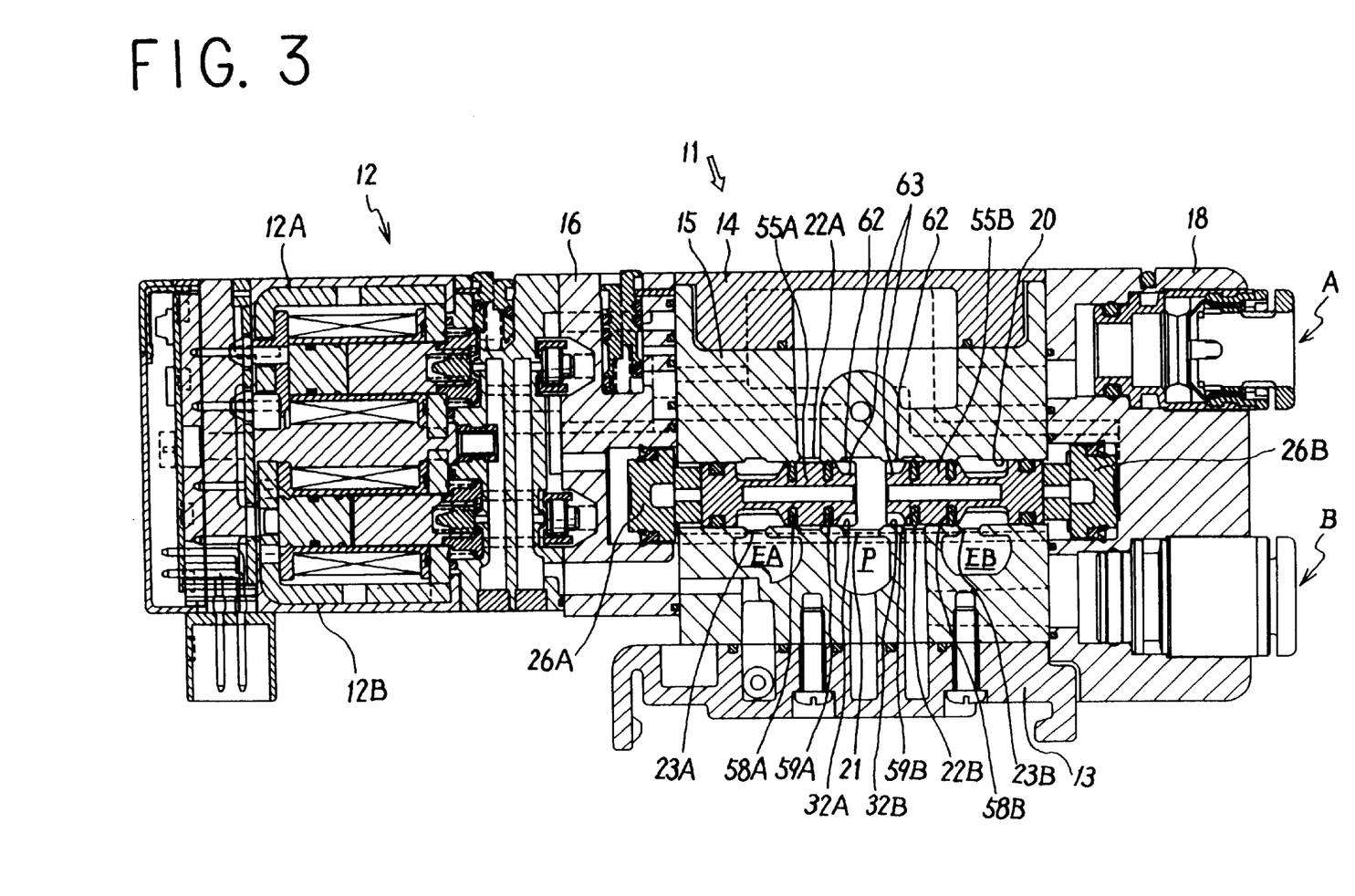
FIG. 3 is a sectional view showing a second embodiment of a two-port solenoid valve according to this invention.

Although the first embodiment in FIG. 1 accommodates in the valve body 15 the valve discs 25A and 25B constituting two normally-closed two-port valves, the structures of the valve discs may be altered slightly to provide two normally-opened two-port valves, as in the second embodiment shown in FIG. 3.

As in the first embodiment, two valve discs 55A and 55B slidably disposed inside the valve hole 20 according to the second embodiment are located on the respective sides of the supply channel 21 and use the acting force of the fluid pressure in the supply channel 21 as returning force for the valve discs 55A and 55B. The valve discs 55A and 55B, however, have seal members 58A and 58B, respectively, that continuously seal the portions between the output channels 22A and 22B and the ejection channels 23A and 23B, respectively, regardless of the operating positions of the valve discs; and seal members 59A and 59B that open and close the portions between the supply channel 21 and the output channels 22A and 22B.

In response to the operation of the valve discs, the seal members 29A and 29B according to the first embodiment move between the intermediate position at which they are located on the supply channel 21 and the position between the supply channel 21 and the output channels 22A and 22B at which they ride onto the lands 32A and 32B, respectively. In response to the operation of the valve discs, however, the seal members 59A and 59B according to the second embodiment move between the intermediate position at which they are located on the output channel 22A or 22B and the position at which they ride onto the lands 32A and 32B, respectively, thereby allowing the two valve discs 55A and 55B to constitute normally-opened two-port valves. In addition, to allow the seal members 59A and 59B to smoothly ride onto the lands, a plurality of guide sections 62 that are located on the lands 32A and 32B to guide the seal members 29A and 29B onto the lands even when the seal members are dislocated from the lands are provided around the valve discs on the supply channel 21 side of the seal members 59A and 59B so that a channel groove 63 for a fluid flowing through the supply channel 21 is provided between the guide sections 62.

The other configuration and the operation of the second embodiment are substantially the same as those of the first embodiment, so identical or equivalent main components have the same reference numerals and their description is omitted.

Figure 4:
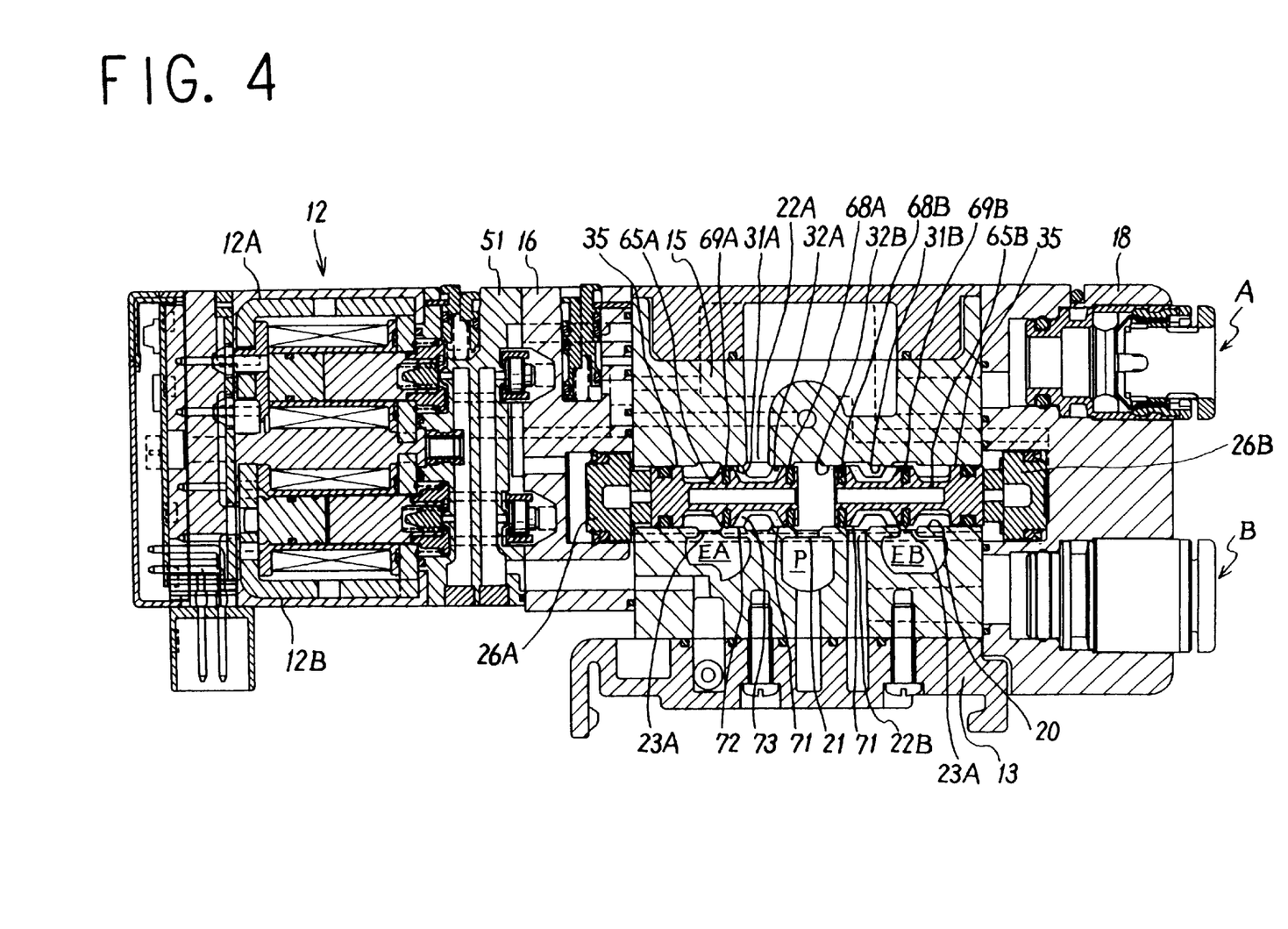
FIG. 4 is a sectional view showing a third embodiment of a two-port solenoid valve according to this invention.

FIG. 4 shows a third embodiment of this invention. This solenoid valve use a five-port valve body 15 that is nearly the same as in the first embodiment, but the structure of the valve disc has been altered slightly compared to the first and second embodiment in order to continuously block the communication between the supply channel 21 and the output channels 22A and 22B so that the ejection throughholes EA and EB can operate as a fluid channel for supplying a positive or negative pressure fluid.

As in the first embodiment, two valve discs 65A and 65B according to this invention are located on the respective sides of the supply channel 21 and use the acting force of the fluid pressure in the supply channel 21 as returning force for the valve discs. The valve discs 65A and 65B, however, have seal members 68A and 68B that contact the lands 32A and 32B, respectively, between the supply channel 21 and the output channels 22A and 22B to continuously seal the portions between the channels regardless of the operating positions of the valve discs; and seal members 69A and 69B that ride onto the lands 31A and 31B, respectively, to open and close the portions between the output channels 22A and 22B and the fluid channels 23A and 23B, respectively.

Furthermore, to stabilize the positions of the valve discs 65A and 65B, the guide section 35 and a guide section 71 are provided near the respective ends of the valve discs. The guide section 35 is the same as in the first embodiment. The guide section 71 is different from the guide section in the first embodiment in that the seal members 68A and 68B adjacent to the section 71 continuously contact the lands 32A and 32B, respectively, but is structurally the same as the guide section shown in FIG. 2.

In addition, to allow the seal members 69A and 69B to smoothly ride onto the lands 31A and 31B, a plurality of guide sections 72 that are located on the lands 31A and 31B to guide the seal members 69A and 69B onto the lands even when the seal members are dislocated from the lands are provided around the valve discs on the output channel 22A, 22B side of the seal members 69A and 69B so that a channel groove 73 for a fluid flowing through the output channel 22A is provided between the guide sections 72.

The other configuration and the operation of the third embodiment are substantially the same as those of the first embodiment, so identical or equivalent main components have the same reference numerals and their description is omitted.

Figure 5:
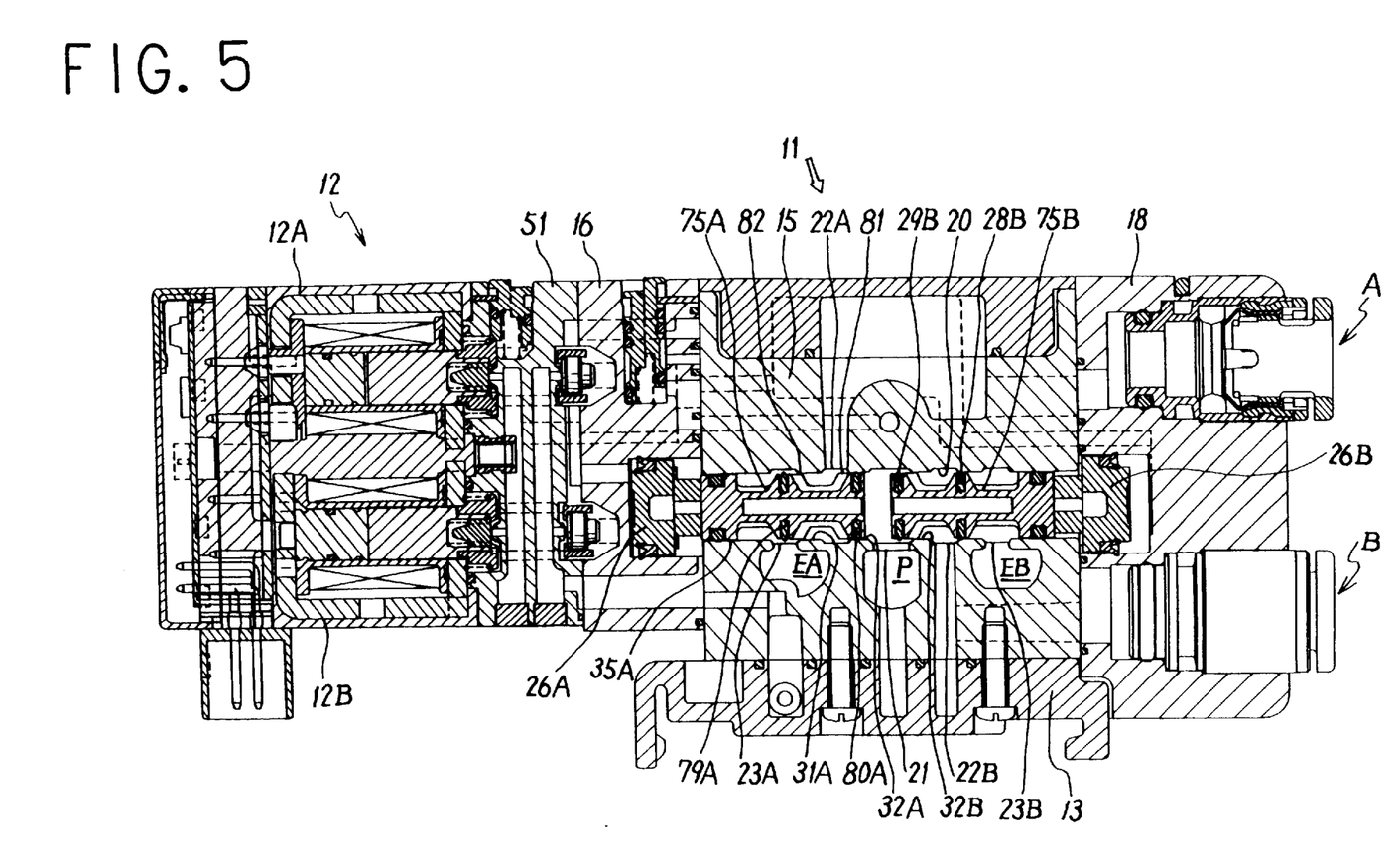
FIG. 5 is a sectional view showing a fourth embodiment of a solenoid valve according to this invention.

FIG. 5 shows a fourth embodiment of this invention. Although each of the above embodiments integrates the two two-port valves into the five-port valve body 15, this embodiment integrates one two-port valve and one three-port valve into the same valve body.

Although the two valve discs 75A and 75B are located on the respective sides of the supply channel 21 and use the acting force of the fluid pressure in the supply channel 21 as returning force for the valve discs, as in the first embodiment, the valve disc 75A is used to constitute a three-port valve and the valve disc 75B is used to constitute a two-port valve.

Specifically, the valve 75A has seal members 79A and 80A that switch the output channel 22A between the supply channel 21 and ejection channel 23A for communication. To allow this valve to function as a three-port valve, the seal members 79A and 80A moves between the sealing position at which they ride onto the lands 31A and 32A and the intermediate position at which they are located on the supply channel 21 or ejection channel 23A.

To stabilize the position of the valve disc 75A, the guide section 35A and a guide section 81 are provided near the respective ends of the valve disc, as in the first embodiment. To allow the seal member 79A to smoothly ride onto the land 31A, a plurality of guide sections 82 that are located on the land 31A to guide the seal member 79A onto the land even when the seal member is dislocated from the land are provided around the valve discs on the output channel 22A side of the seal member 79A so that a channel groove is provided between the guide sections, as in FIG. 2.

On the other hand, the valve disc 75B constituting a two-port valve is the same as in the first embodiment described with reference to FIGS. 1 and 2, so its description is omitted.

The other configuration and the operation of the fourth embodiment are substantially the same as those of the first embodiment, so identical or equivalent main components have the same reference numerals and their description is omitted.

According to the two-port solenoid valve of this invention described above in detail, inexpensive two-port valves can be obtained wherein if a large number of five-port valves are connected together, the two-port valves can be mixed with such five-port valves by integrating two two-port solenoid valves or one two-port and one three-port valves into a valve body for a five-port solenoid valve.

What is claimed is:

1. A two-port solenoid valve using a valve body for a five-port solenoid valve comprising:

a main valve having a five-port valve body in which a valve hole is opened and which has a supply channel opened at a center of the valve hole, two output channels opened on respective sides of the supply channel, and two ejection channels opened on respective sides of the output channels, said main valve also having a valve disc slidably disposed in the valve hole, and first and second pistons on respective axial sides of the valve hole, said main valve operating the valve disc using an effect of a pilot fluid pressure on the pistons;

a pilot valve section having first and second pilot solenoid valves including first energizing and second de-energizing solenoids that operate to individually apply a pilot fluid pressure to the first and second pistons;

wherein the valve disc that is inserted into the valve hole in the valve body is composed of two valve discs located on the respective sides of the supply channel and uses an acting force of fluid pressure in the supply channel as a returning force for the valve discs;

wherein these two valve discs each have a first seal member for continuously sealing a portion between the output channels and the ejection channels, regardless of operating positions of the valve discs, and a second seal member for opening and closing the portion between the supply channel and the output channels;

wherein, on land sides of the seal members that are provided on the valve discs and that switch between a communication position at which the seal members are dislocated from lands and a sealing position at which the seal members ride onto the lands, there is provided a plurality of guide sections, located on the lands to guide the seal members onto the lands even when the seal members are dislocated from the lands, said guide sections being arranged around the valve discs in such a way that a channel groove for a fluid flowing through the supply channel is provided between the guide sections;

wherein said channel groove is constricted between the seal members so that longitudinal axes of the valve discs are not tilted relative to a longitudinal axis of the valve hole, thus stabilizing positions of the valve discs.

2. A two-port solenoid valve using a valve body for a five-port solenoid valve comprising:

a main valve having a five-port valve body in which a valve hole is opened and which has a supply channel opened at a center of the valve hole, two output channels opened on respective sides of the supply channel, and two fluid channels opened on respective sides of the output channels, said main valve also having a valve disc slidably disposed in the valve hole, and first and second pistons on respective axial sides of the valve hole, said main valve operating the valve disc using an effect of a pilot fluid pressure on the pistons;

a pilot valve section having first and second pilot solenoid valves, including first energizing and second de-energizing solenoids that operate to individually apply a pilot fluid pressure to the first and second pistons;

wherein the valve disc that is inserted into the valve hole in the valve body is composed of two valve discs located on the respective sides of the supply channel and uses an acting force of fluid pressure in the supply channel as a returning force for the valve discs;

wherein these two valve discs each have a first seal member for continuously sealing a portion between the supply channel and the output channels, regardless of operating positions of the valve discs, and a second seal member for opening and closing the portion between the output channel and the fluid channels;

wherein, on land sides of the seal members that are provided on the valve discs and that switch between a communication position at which the seal members are dislocated from lands and a sealing position at which the seal members ride onto the lands, there is provided a plurality of guide sections, located on the lands to guide the seal members onto the lands even when the seal members are dislocated from the lands, said guide sections being arranged around the valve discs in such a way that a channel groove for a fluid flowing through the output channel is provided between the guide sections;

wherein said channel groove is constricted between the seal members so that longitudinal axes of the valve discs are not tilted relative to a longitudinal axis of the valve hole, thus stabilizing positions of the valve discs.

3. A two or three-port solenoid valve using a valve body for a five-port solenoid valve comprising;

a main valve having a five-port valve body in which a valve hole is opened and which has a supply channel opened at a center of the valve hole, two output channels opened on respective sides of the supply channel, and two ejection channels opened on respective sides of the output channels, said main valve also having a valve disc slidably disposed in the valve hole, and first and second pistons on respective axial sides of the valve hole, said main valve operating the valve disc using an effect of a pilot fluid pressure on the pistons;

a pilot valve section having first and second pilot solenoid valves, including first energizing and second de-energizing solenoids that operate to individually apply a pilot fluid pressure to the first and second pistons;

wherein the valve disc that is inserted into the valve hole in the valve body is composed of two valve discs located on the respective sides of the supply channel and uses an acting force of fluid pressure in the supply channel as a returning force for the valve discs;

wherein one of the two valve discs has a first seal member for continuously sealing a portion between the output channels and the ejection channels, regardless of operating positions of the valve discs, and a second seal member for opening and closing a portion between the supply channel and the output channels, while the other of the two valve discs has third and fourth seal members for switching the output channels between the supply channel and the ejection channels;

wherein, on land sides of the seal members that are provided on the valve discs and that switch between a communication position at which the seal members are dislocated from lands and a sealing position at which the seal members ride onto the lands, there is provided a plurality of guide sections, located on the lands to guide the seal members onto the lands even when the seal members are dislocated from the lands, said guide sections being arranged around the valve discs in such a way that a channel groove for a fluid flowing through the supply channel is provided between the guide sections;

wherein said channel groove is constricted between the seal members so that longitudinal axes of the valve discs are not tilted relative to a longitudinal axis of the valve hole, thus stabilizing positions of the valve discs.

* * * * *